United States Patent
Drewery et al.

(10) Patent No.: US 12,434,988 B2
(45) Date of Patent: *Oct. 7, 2025

(54) BIOFILM REACTOR FOR TREATING WASTEWATER

(71) Applicants: Tommy Gig Drewery, Longview, TX (US); Trina Vern Drewery, Longview, TX (US)

(72) Inventors: Tommy Gig Drewery, Longview, TX (US); Trina Vern Drewery, Longview, TX (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/837,928

(22) Filed: Jun. 10, 2022

(65) Prior Publication Data

US 2023/0399247 A1    Dec. 14, 2023

(51) Int. Cl.
 *C02F 3/10*    (2023.01)
 *C02F 3/20*    (2023.01)

(52) U.S. Cl.
 CPC .............. *C02F 3/101* (2013.01); *C02F 3/103* (2013.01); *C02F 3/108* (2013.01); *C02F 3/109* (2013.01); *C02F 3/20* (2013.01)

(58) Field of Classification Search
 CPC .... C02F 3/101; C02F 3/20; C02F 3/10; C02F 3/109; C02F 3/103; C02F 3/108
 USPC ................................................. 210/150, 615
 See application file for complete search history.

(56) References Cited

U.S. PATENT DOCUMENTS

| | | |
|---|---|---|
| 5,162,083 A | 11/1992 | Forbes |
| 5,266,239 A | 11/1993 | Drewery |
| 6,096,203 A | 8/2000 | Drewery |
| 6,165,359 A | 12/2000 | Drewery |
| 6,254,066 B1 | 7/2001 | Drewery |
| 6,554,996 B1 | 4/2003 | Rebori |
| 7,718,067 B2 | 5/2010 | Holt |
| 2008/0017574 A1* | 1/2008 | Lenger ............... C02F 3/343 210/615 |
| 2017/0320761 A1* | 11/2017 | Boutet ............... C02F 3/101 |

FOREIGN PATENT DOCUMENTS

| | | | | |
|---|---|---|---|---|
| DE | 202015103162 U1 * | 8/2015 | ............... | C02F 3/06 |
| GB | 2281082 A * | 2/1995 | ............... | C02F 3/06 |
| WO | WO-9506010 A1 * | 3/1995 | .......... | B01F 3/04269 |

OTHER PUBLICATIONS

Gottfried, DE 202015103162 U1, English machine translation, pp. 1-4 (Year: 2015).*

* cited by examiner

*Primary Examiner* — Claire A Norris

(74) *Attorney, Agent, or Firm* — Egbert, McDaniel & Swartz, PLLC

(57) ABSTRACT

A wastewater treatment apparatus has a tank with an access opening, at least one fixed film media pod positioned in the interior of the tank, a diffuser positioned in the interior of the tank, and an air pump connected to the diffuser. The fixed film media pod is formed of a polymeric material and has openings framed by the polymeric material. The diffuser is adapted to aerate liquid in the interior of the tank. The media pod has a tubular structure extending vertically in the interior of the tank and positioned above the bottom of the tank. Floats are attached to the top of the media pod so as to suspend the media pod in the liquid in the tank.

5 Claims, 5 Drawing Sheets

BIOFILM REACTOR FOR TREATING WASTEWATER

CROSS-REFERENCE TO RELATED APPLICATIONS

Not applicable.

BACKGROUND OF THE INVENTION

1. Field of the Invention

The present invention relates to wastewater treatment. More particularly, the present invention relates to forming biofilm wastewater treatment tanks adapted to aerate the wastewater. The present invention also relates to the conversion of septic or other waste storage tanks into biofilm reactors.

2. Description of Related Art Including Information Disclosed Under 37 CFR 1.97 And 37 CFR 1.98

Septic tank and drainfield systems have a history of failure problems. Although the systems have been used for years and are still a preferred method for treating and dispersing domestic wastewater from homes and small commercial establishments, such septic tank and drainfield systems have inherent problems and also pollute the environment.

One problem is that treatment in the septic tank is minimal. The septic tank utilizes anaerobic bacteria to carry out the treatment. This anaerobic bacteria is bacteria that does not use oxygen and is consequently very slow at treating the wastewater. Consequently, when the wastewater leaves the septic tank toward the drainfield, the wastewater is poorly treated. The effluent from the septic tank is high in total suspended solids and high in biological oxygen demand. This places a high treatment demand on the drainfield before the effluent is dispersed through the soil interface of the drainfield and into the surrounding soil and onto the ground water. In fact, it is the soil interface where the final treatment of the septic effluent occurs. The soil interface of the drainfield is generally described as the bottom and inside walls of the drainfield. The same anaerobic bacteria utilized in the septic tank is responsible for the final treatment at the soil interface in the drainfield. This anaerobic treatment process forms a sludge biomat at the soil interface. In other words, the bacteria uses the soil interface as a media to grow on. As the effluent passes through the biomat, the final treatment occurs and the biomat grows or enlarges.

From a management perspective, this anaerobic treatment process is inadequate. The very treatment process that provides final treatment of the effluent will plug the soil interface. As the biomat grows, more and more soil becomes plugged. When enough soil of the drainfield is plugged, the remaining soil is inadequate to treat and disperse the effluent from the septic tank. As a result, the septic tank and the drainfield start to fail. The failure starts with short periods of high-level conditions in the septic tank which can affect the proper use of the facilities in the home. The failure can also start with inadequately treated effluent surfacing at the drainfield area. Both of these conditions can occur simultaneously. If left unattended, complete failure is imminent. During this condition, the environment is being polluted. Studies have been conducted which reveal groundwater and well water contamination without the aforementioned signs of failure.

In the past, septic tank and drainfield failure has been somewhat accepted. Septic tank and drainfield replacement has been the only solution.

Experiments and testing have shown that aerobic system effluent can be a much higher quality effluent, much lower in total suspended solids and much lower in biological oxygen demand. Therefore, the drainfield has to do much less treatment. The aerobic system is also high in dissolved oxygen and has high levels of aerobic bacteria. Not only does the aerobic system effluent protect the drainfield from further plugging, it starts to reverse the drainfield plugging that has already occurred. No longer does the drainfield operate in the anaerobic mode (void of oxygen), but it operates in a high dissolved oxygen state. It is this high dissolved oxygen in the presence of high levels of aerobic bacteria that destroys the anaerobic biomass and consumes it. As this occurs, the soil interface becomes unplugged and proper drainfield functions are restored.

Due to these findings, septic tank conversion products can convert already installed septic tanks into aerobic treatment systems. For example, U.S. Pat. No. 5,162,083, issued on Nov. 10, 1992 to Forbes et al., describes a method and apparatus for converting a standard anaerobic septic tank system to an aerobic system where the effluent discharged at a high level of quality sufficient to meet or exceed all national and state standards. The method provides a series of steps that are used to convert a pre-existing anaerobic septic tank to a highly efficient aerobic system. The system includes an aerator and a clarifier insert which has the capability of adding an optional chlorine chamber which dispenses chlorine into the effluent line in its final stages. The system requires building a new lid and attaching a clarifier and diffuser drops to the lid. The lid and the attached clarifier and diffuser drops are lowered into the septic tank and attached to the septic tank. This method requires excavation and hoisting equipment. This is costly and can cause damage to the finished yard landscaping.

U.S. Pat. No. 6,554,996, issued on Apr. 29, 2003 to R. J. Rabori, describes a wastewater treatment system and apparatus for converting a typical anaerobic septic tank system into an efficient aerobic treatment system for treating a liquor containing biodegradable wastes. The apparatus includes a collapsible reactor module that can pass through a relatively small opening in the septic tank cover. The reactor module contains media therein in which the liquor to be treated is recirculated and aerated. The reactor module is full of fixed film media. Although this device does away with the costly excavation and hoisting procedures, the product itself is costly due to the nature of the fixed film media systems.

As septic tank drainfield systems continue to fail, a more cost-effective septic tank conversion method is required. U.S. Pat. No. 7,718,067, issued on May 18, 2010 to K. K. Holt, teaches a method and apparatus for mediating a failed or failing wastewater treatment system. This method includes a positive air generating pressure pump directing air through a tube to an air stone suspended in the effluent. Attached growth bacteria grow on a plurality of random directional brushes in an effluent tank, e.g. a septic tank. This method allows for installation of the equipment through an opening in the septic tank lid and avoids expensive excavating and hoisting. It also prevents finished landscape destruction. Also, the cost is much less than fixed film media aerobic systems. The method of the Holt patent places a diffuser or aerator directly into the septic tank. Air is introduced through the diffuser and causes the contents of the septic tank to be mixed. As the contents are mixed together, dissolved oxygen is transferred into the solution. The septic tank is converted from an anaerobic environment to an aerobic environment. Aerobic bacteria begin to multiply and form suspended solids within the septic tank. As the aerobic bacteria colony grows or multiplies, so do the suspended solids within the septic tank. Although this process gives the septic tank the ability to aerobically treat the household waste, it simultaneously creates a problem in that the suspended solids carry out of the septic tank to the drainfield into the environment. These suspended solids are mostly made up of partially metabolized or digested wastes and consequently cause damage to the drainfield and the environment.

The present inventor is the inventor identified in several patents associated with aerobic wastewater treatment systems. For example, U.S. Pat. No. 5,266,239, issued on Nov. 30, 1993 to the present inventor, describes a diffuser assembly for an aeration system of a wastewater treatment plant. This aeration apparatus has an air line connected to an air source, a drop line connected in fluid communication with the air line, a check valve positioned in the drop line between an orifice at the bottom of the drop line and the air line, and a diffuser member extending around the orifice on the drop line. The check valve serves to prevent liquid from passing therethrough. The drop line includes a tube which extends downwardly from the air line.

U.S. Pat. No. 6,096,203, issued on Aug. 1, 2000 to the present inventor, teaches a wastewater treatment system having a tank with an inlet and an outlet and an offset access opening residing at the top of the tank. A clarifier compartment is positioned within the tank. An aeration compartment is formed within the tank around the exterior of the clarifier compartment. Aerators extend into the aeration compartment so as to supply air to the wastewater within the aeration compartment. The access opening is formed between a center of the top and outer wall of the tank. Each of the aerators includes an air inlet, a conduit connected to the air inlet, a diffuser assembly connected to an end of the conduit opposite the air inlet, and an anchor connected to the diffuser assembly opposite the conduit so as to maintain the diffuser in a fixed position within the aeration compartment.

U.S. Pat. No. 6,165,359, issued on Dec. 26, 2000 to the present inventor, shows a high-strength wastewater treatment system having a first tank with an inlet and an outlet, an aerator positioned within the first tank for passing oxygen into the wastewater within the first tank, a second tank having a clarifier compartment positioned therein, an aeration device positioned in the second tank for passing oxygen into a liquid within the second tank, and a pipe connected the first tank and the second tank for passing liquid from the second tank to the first tank. The pipe has an end opening within the second tank and a diffuser connected to the pipe within the first tank. The diffuser is a venturi diffuser. An air pump is connected to the venturi diffuser for injecting air into the narrow section of the diffuser. This delivery of air serves to draw liquid from the second tank through the pipe and into the first tank.

U.S. Pat. No. 6,254,066, issued on Jul. 3, 2001 to the present inventor, provides an apparatus for aerating liquid in a wastewater treatment tank. The apparatus has a submergable motor with a shaft extending outwardly therefrom, a supporting member affixed to the submergable motor and adapted to maintain the submergable motor in a position within the liquid in the wastewater treatment tank. A propeller is affixed to the shaft of the submergable motor. A housing extends around the propeller and the shaft. An air tube is connected to the housing and is adapted to pass air interior of the housing between the propeller and the motor.

It is an object the present invention to provide a wastewater treatment system that transforms a septic tank into a biofilm reactor.

It is another object of the present invention to provide a wastewater treatment apparatus that allows drainfields to recover.

It is another object of the present invention to provide a wastewater treatment apparatus that does not require replacement of existing tanks.

It is another object of the present invention to provide a wastewater treatment apparatus that avoids septic tank replacement costs.

It is another object of the present invention provide a wastewater treatment apparatus that avoids destruction of property.

It is another object of the present invention to provide a wastewater treatment apparatus that protects the environment.

It is another object of the present invention to provide a wastewater treatment apparatus that reduces the release of pollutants into the environment.

It is another object of the present invention to provide a wastewater treatment apparatus that is quickly and easily installed.

It is another object of the present invention to provide a wastewater treatment apparatus that avoids the use of heavy equipment on existing installed tanks.

It is another object of the present invention provide a wastewater treatment apparatus in which greater than 90% of the wastewater treatment occurs inside the treatment tank.

It is another object of the present invention to provide a wastewater treatment apparatus that produces a clear and odorless effluent.

It is another object of the present invention provide a wastewater treatment apparatus that does not require a clarifier.

It is another object of the present invention to provide a wastewater treatment apparatus that avoids the formation of suspended solids It is another object of the present invention to provide a wastewater treatment apparatus that avoids the stirring of sludge at the bottom of the tank.

It is another object of the present invention to provide a wastewater treatment system that provides sludge storage management at the bottom of the tank below the media.

It is a further object of the present invention provide a wastewater treatment apparatus that has minimal transportation costs.

It is still a further object of the present invention to provide a wastewater treatment system that can utilize standard industry septic tanks without further modification (including compartment sizing).

It is still another object of the present invention provide a wastewater treatment apparatus that can fully nitrify the wastewater.

It is a further object of the present invention to provide a wastewater treatment system where the treatment capacity can be modified at any time in the future.

These and other objects and advantages of the present invention will become apparent from a reading of the attached specification and appended claims.

BRIEF SUMMARY OF THE INVENTION

The present invention is a wastewater treatment apparatus that comprises a tank having an access opening thereon, at least one fixed film media pod positioned in the interior of the tank, a diffuser positioned in the interior of the tank, and an air pump connected to the diffuser. The tank has an inlet adapted to allow wastewater to enter an interior of the tank. The tank has an outlet adapted to allow effluent to exit the tank. The fixed film media pod is formed of a polymeric material having openings framed by the polymeric material. The diffuser is adapted to aerate liquid in the interior of the tank. The air pump is positioned exterior of the tank.

In the wastewater treatment apparatus of the present invention, the fixed film media pod comprises a tubular structure extending generally vertically in the interior of the tank. This tubular structure is positioned above a bottom of the tank. The tubular structure has an interior mesh structure extending generally across the inner diameter of the tubular structure. This interior mesh structure has a generally teardrop shape in a cross-sectional plane extending parallel to the bottom of the tank.

In the preferred embodiment, the diffuser is affixed to at least one of the fixed film media pods so as to be suspended above the bottom of the tank. Each of the fixed film media pods has a top ring and a bottom ring. Each of the fixed film media pods is formed of a plastic mesh material extending over and around the top ring and the bottom ring. The fixed film media pod has at least one weight thereon. This weight is adapted to counter forces from the diffuser so as to maintain the vertical orientation of the fixed film media pod.

The fixed film media pod has an outer diameter less than an inner diameter of the access opening. The fixed film media pod has a float at the top thereof. The float is adapted to cause the fixed film media pod to float slightly below a surface of the liquid in the tank and above the bottom of the tank. A line can be connected to the fixed film media pod and/or to the float. The line facilitates the ability to lower the fixed film media pod into the tank and to remove for maintenance.

The present invention is also a method of forming a biofilm reactor. This method includes the steps of: (1) forming a fixed film media pod having a polymeric mesh structure with openings framed by the polymeric material; (2) affixing at least one float onto the fixed film media pod; (3) installing the fixed film media pod through an access opening of a wastewater treatment tank and into a liquid in the interior of the tank such that the fixed film media pod resides above the bottom of the tank and slightly below a surface of the liquid in the tank; (4) placing an air diffuser through the riser opening and into the liquid on the interior of the tank; and (5) connecting the air diffuser to an air pump positioned exterior of the tank.

In this method, the step of forming comprises wrapping the polymeric mesh around a top ring and a bottom ring so as to create a generally tubular structure. Ends of a polymeric mesh panel are joined together so as to create a teardrop-shaped structure. This teardrop-shaped structure is affixed into an interior of the generally tubular structure of the fixed film media pod.

In an embodiment of the present invention, the air diffuser is affixed onto a surface of the fixed film media pod such that the air diffuser is positioned above the bottom of the tank. An air line is extended from the air diffuser outwardly of the fixed film media pod and outwardly of the riser opening. An end of the air line is connected to the air pump. The air diffuser is affixed onto a surface of the fixed film media pod such that the air diffuser is positioned above a bottom of the tank. A weight is applied adjacent to the bottom of the fixed film media pod on a same side of the fixed film media pod as the side to which the air diffuser is affixed. The weight is adapted to counter a force of air within the air diffuser.

In the present invention, the step of forming includes applying a float on the fixed film media pod adjacent the top of the fixed film media pod. The float is adapted to cause the fixed film media pod to float slightly below the liquid in the tank and above the bottom of the tank.

The present invention is also a fixed film media pod for treating wastewater. This fixed film media pod comprises a generally tubular structure of a polymeric mesh material having openings framed by the polymeric material, a top ring surrounded by or surrounding the polymeric mesh material, a bottom ring surrounded by or surrounding the polymeric mesh material, and at least one float affixed to the generally tubular structure adjacent to the top ring.

An interior mesh is positioned on the interior of the generally tubular structure. This interior mesh has a generally teardrop shape in a cross-sectional plane extending transverse to the longitudinal axis of the generally tubular structure. An air diffuser is affixed to the generally tubular structure at a location above the bottom ring. An air line is affixed to the air diffuser and extends outwardly of the generally tubular structure. At least one weighted member is affixed adjacent to the bottom ring. A line can be connected to the fixed film media pod adjacent the top ring. The line extends outwardly and provides a way of easily lower or raising the fixed film media pod.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
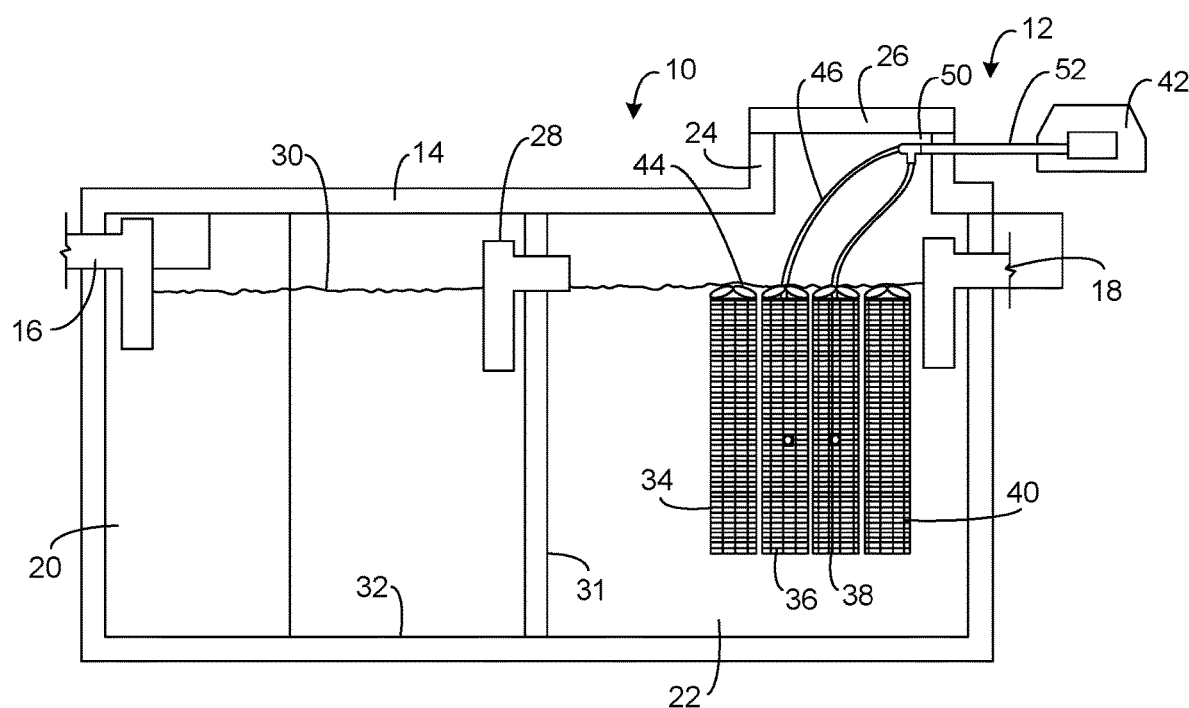
FIG. 1 is a cross-sectional view of a wastewater treatment tank employing the wastewater treatment apparatus of the present invention.

Referring to FIG. 1, there is shown a wastewater treatment system 10 employing the biofilm reactor 12 of the present invention. Specifically, FIG. 1 shows a tank 14 having an inlet 16 and an outlet 18. The tank 14 includes a first compartment 20 and a treatment compartment 22. The tank 14 includes a riser opening 24 at a top of the tank 14. A lid 26 extends over the riser opening 24. The inlet 16 is adapted to allow wastewater to enter the interior of the tank 14. Specifically, in the embodiment shown in FIG. 1, the inlet 16 is adapted to allow wastewater to enter into the first compartment 20 of the tank 14. An outlet 28 is formed on the wall 31 in tank 14 so as to allow the liquid in the first compartment 20 of tank 14 to flow into the treatment compartment 22 of tank 14. It can be seen in FIG. 1 that the wastewater has a surface 30. The outlet 18 is adapted to allow effluent to exit the tank 14.

Specifically, with reference to FIG. 1, a two compartment tank 14 is illustrated. However, within the concept of the present invention, the biofilm reactor 12 can be employed in a single tank or in a single compartment tank. In the configuration shown in FIG. 1, the wastewater will enter through the inlet 16 and reside in the first compartment 20. Solids will settle to the bottom 32 of the tank 14. Ultimately, as the liquid in the first compartment 20 rises, it reaches a level of the outlet 28 and then flows into the treatment compartment 22. The biofilm reactor 12 of the present invention can then introduce air into the wastewater in the interior of the treatment compartment 22. After the aerobic treatment is achieved in the treatment compartment 22, the effluent can then flow through the outlet 18 and to a drainfield or to other disposal methods.

FIG. 1 shows that there are a plurality of fixed film media pods 34, 36, 38 and 40 configured in a Drewery array and positioned in the interior of the tank 14. Each of a plurality of fixed film media pods 34, 36, 38 and 40 is formed of a polymeric material having openings framed by the polymeric material. Diffusers (shown in FIGS. 2-4) are positioned in the interior of the tank 14. The diffusers are adapted to aerate the liquid in the interior of the tank and, in particular, in the treatment compartment 22 of tank 14. An air pump 42 is connected to the diffusers. This air pump 42 is positioned exterior of the tank 14.

Each of the plurality of fixed film media pods has a generally tubular structure extending vertically in the interior of the tank 14. It can be seen that the tubular structures of the plurality of fixed film media pods 34, 36, 38 and 40 is positioned above the bottom 32 of the tank 14. Each of the fixed film media pods 34, 36, 38 and 40 has a float 44 at a top thereof. These floats 44 are adapted to cause the plurality of fixed film media pods 34, 36, 38 and 40 to float slightly below the surface 30 of the liquid in the tank 14 and above the bottom 32 of the tank 14. Air lines 46 and 48 extend from the air pump 42 to diffusers positioned on the fixed film media pods 36 and 38, respectively.

In FIG. 1, it can be seen that each of the plurality of fixed film media pods 34, 36, 38 and 40 has an outer diameter less than an inner diameter opening of the riser 24. In the configuration of the present invention shown in FIG. 1, the plurality of fixed film media pods 34, 36, 38 and 40 are formed of a polymeric mesh structure with openings framed by the polymeric material. The floats 44 are respectively affixed to the fixed film media pods 34, 36, 38 and 40. Each of the fixed film media pods 34, 36, 38 and 40 is installed through the access opening of the riser 24 of the tank 14 and into the liquid in the interior of the tank such that the fixed film media pods 34, 36, 38 and 40 reside above the bottom 32 of the tank 14 and slightly below the surface 30 of the liquid in the tank. Each of the fixed film media pods 34, 36, 38 and 40 is of a vertical orientation. The air diffusers are introduced through the access opening of the riser 24 and into the liquid within the tank 14. In the preferred embodiment the present invention, the diffusers will be affixed to a surface of at least one of the fixed film media pods 34, 36, 38 and 40 and positioned above the bottom 32 of the tank 14. As will be described hereinafter, the diffuser will be positioned generally centrally of a length of the fixed film media pods. Not all of the fixed film media pods 34, 36, 38 and 40 have diffusers thereon. It is only necessary to affix diffusers in accordance with the aeration requirements for the particular wastewater being treated. The air diffusers are connected to the air pump 42 through the opening of the riser 24. Specifically, the ends of the air lines 46 and 48 are connected to a T-fitting 50 which joins to a line 52 extending to air pump 42. The air pump 42 can then be activated so as to introduce air through the lines 52, 46 and 48 such that air is diffused by the fine air diffusers located on the fixed film media pods 36 and 38. As such, the liquid on the interior of the treatment compartment 22 of tank 14 is aerated and mixed.

Experiments with the present invention have shown that the Drewery array of fixed film media pods 34, 36, 38 and 40, in combination with the aeration capabilities, greatly improves the quality of the effluent released through the outlet 18. This allows wastewater to circulate through the media from all directions and provides for long stringy colonies of biofilm the form and wave in the circulation. This provides more treatment per square foot of media than in previous applications. Specifically, tests have shown that the total suspended solids released will be in single digits and the carbonaceous biochemical oxygen demand will be of single digits. This is less than the total suspended solids of thirty and the carbonaceous biochemical oxygen demand of twenty-five required by standards. As such, the effluent can be directly released into a drainfield or to other locations in an exterior environment without further treatment.

The installation occurs very easily. Since each of the fixed film media pods 34, 36, 38 and has a diameter less than the diameter of the opening of the riser 24, they can be simply placed into the tank 14 by removing the lid 26. The floats 44 allow each of the fixed film media pods 34, 36, 38 and 40 to float in a desired positioned within the liquid in the tank 14. In the preferred embodiment of the present invention, each of the fixed film media pods 34, 36, 38 and 40 will have an 8½ inch diameter. The floats will cause each of the fixed film media pods 34, 36, 38 and 40 to float approximately two inches under the surface 30 of the liquid and approximately eight to twelve inches off the bottom 32 of the tank 14. Each of the fixed film media pods 34, 36, 38 and 40 will be formed of a tubular mesh media. Although the present invention shows the fixed film media pods 34, 36, 38 and 40 of a tubular shape, it is possible within the present invention that the various other shapes of the polymeric mesh material can suffice for carrying out wastewater treatment. The shapes can include planar shapes, rectilinear shapes, oval shapes, etc. This mesh media has openings of approximately 1.5×1.5 inches. The polymeric material of this mesh material will frame each of the holes. The plastic framing will, in the preferred embodiment, have a width of approximately 3/16 of an inch and a thickness of approximately 1/32 of an inch. It is possible within the concept of the present invention that materials other than polymeric material can be used. Importantly, as wastewater is being treated in the tank 14, the microorganisms will accumulate on the surfaces of the polymeric mesh material. The configuration of each of the fixed film media pods 34, 36, 38 and creates a labyrinth through which the wastewater flows. As the microorganisms accumulate on the surfaces of the fixed film media pod they will form strands (up to two inches or more in length) which further attract other organisms thereon. The combination of the diffuser, the position of the diffuser, and the fixed film media pods causes the flow of the wastewater to pass through the maze created by the fixed film media pod. The biofilm accumulates and extends in a far greater amount than would be expected. The elongation of the microorganisms is believed to be caused by the configuration by the polymeric framed openings of the mesh material. This configuration allows highly oxygenated wastewater effluent to flow in all directions through the labyrinth of the mesh material. This configuration increases the number of microorganisms that can be accumulated on the fixed film media pods, causes strands of microorganisms to be created, and reduces the amount of media required to actually treat the wastewater thereby creating the biofilm reactor.

Within the concept of the present invention, the fixed film media pods 34, 36, 38 and 40 are preferably of a cylindrical configuration. However, any tubular structure will suffice. Also, in the present invention, an interior mesh (as described herein association with FIG. 5) can be incorporated so as to further enhance the "biomaze effect" of the present invention. Although FIG. 1 shows two diffusers, more or fewer diffusers can be used relative to the requirements for oxygen to feed the microbes within the tank. Under certain circumstances, a single diffuser can be appropriate when the biological oxygen demand is low enough.

The clean effluent released through the outlet 18 of the wastewater treatment system 10 of the present invention allows for the recovery of drainfields. As such, the clogging of drain fields associated with prior art systems is avoided. As a result, the life of the wastewater treatment system 10 is extended. The biofilm reactor 12 of the present invention can be installed without the need to replace the existing tank 14. As such, the present invention avoids septic tank and drainfield replacement costs. Since the tank 14 does not need to be removed nor the drainfield replaced, there will be no destruction of property as a result of the installation of the biofilm reactor 12 of the present invention. The Drewery array of the fixed film media pods 34, 36, 38 and 40 of the present invention greatly reduces pollutants released through the outlet 18 and into the environment. As such, the present invention serves to protect the environment. The biofilm reactor of the present invention can be installed very quickly and easily through the opening provided in the riser 24 of the tank 14. No heavy equipment is required. The present invention has greater than 90% of the wastewater treatment occurring within the interior of the tank 14. As such, there is less need for the drainfield to complete the wastewater treatment. The present invention releases a clear and odorless effluent. Also, the present invention does not require any clarifiers. The position of the diffusers above the bottom 32 of the tank 14 avoids any stirring of sludge at the bottom of the tank. Thus preventing solids from leaving the tank outlet and allowing for proper sludge management (i.e. pumping the sludge during normal tank pump-out). The present invention also has minimal transport costs.

Figure 2:
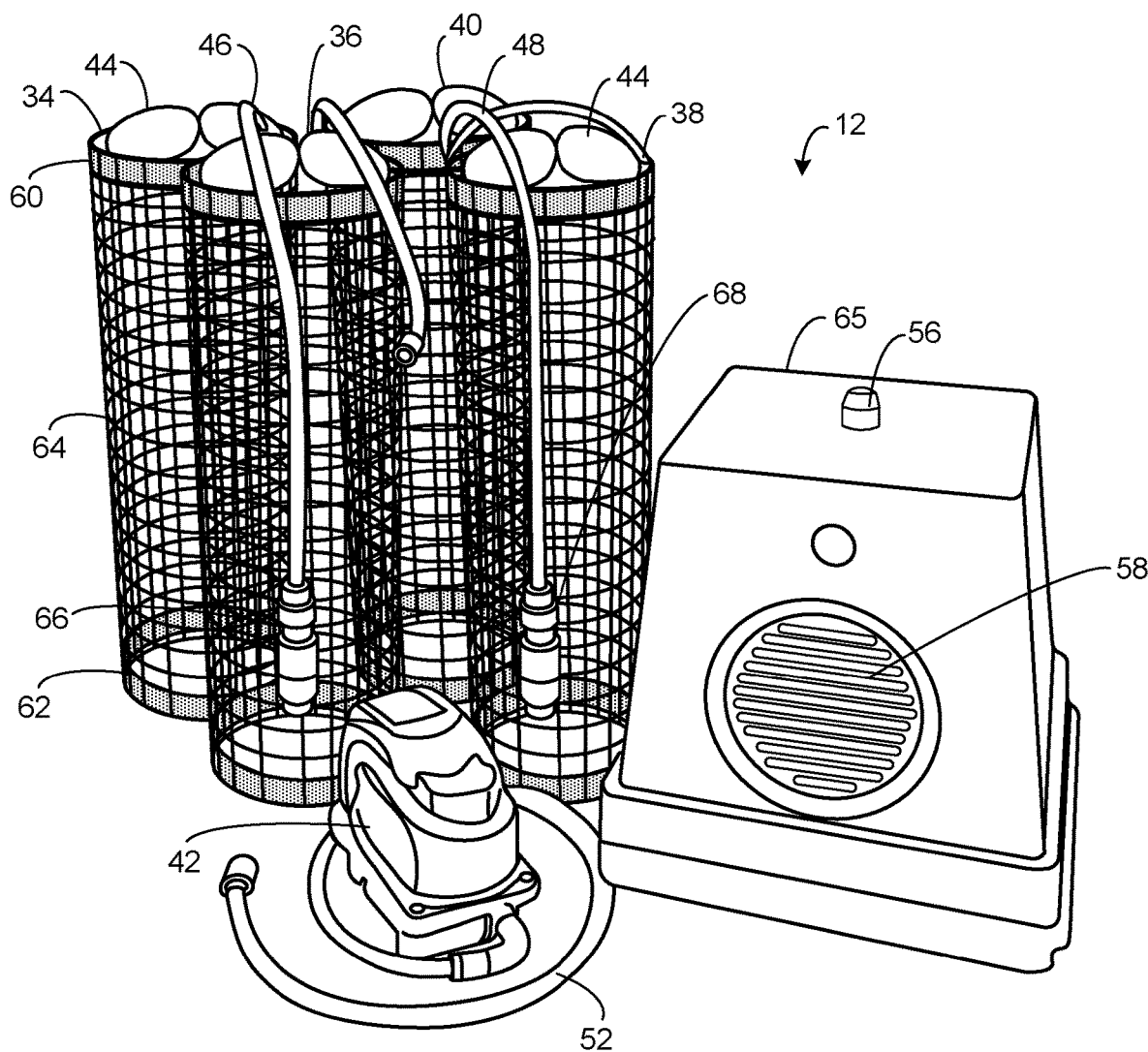
FIG. 2 is an upper perspective view showing the wastewater treatment apparatus of the present invention in which the components are separated from each other.

FIG. 2 shows, in particular, a housing 55 for the air pump 42. Housing 55 has an alarm 56 at a top surface thereof. The housing 55 includes a vent 58 on an exterior surface thereof. Housing will cover the air pump 42 and protect the air pump 42 from the exterior environment. Air pump 42 is illustrated as having air line 52 affixed thereto and extending therefrom. The alarm 56 can be an audio and/or visual alarm. Alarm 56 will be indicative of a malfunction of the air pump 42 of the system.

FIG. 2 shows the fixed film media pods 34, 36, 38 and 40. In particular, in FIG. 2, it can be seen that each of the fixed film media pods 34, 36, 38 and 40 has a top ring 60 and a bottom ring 62. The polymeric mesh material 64 will be wrapped over the top ring 60 and the bottom ring 62. Top ring 60 and bottom ring 62 are configured so as to provide structural integrity to the fixed film media pods 34, 36, 38 and 40. It can be seen that the mesh material 64 defines openings that are surrounded by polymeric material. Floats 44 are provided at a top of each of the fixed film media pods 34, 36, 38 and 40. Floats 44 can be any number of floats required so as to maintain the fixed film media pods 34, 36, 38 and 40 in their desired positions within the interior of the tank 14.

FIG. 2 shows that there is a diffuser 66 affixed to the fixed film media pod 36. Similarly, another diffuser 68 is attached to the fixed film media pod 38. Diffusers 66 and 68 can be separate from the fixed film media pods or they can be attached to the surface of the fixed film media pods. A surface-mounted location is superior since this creates a simple installation procedure. Additionally, the installation of the diffusers 66 and 68 onto the surface of the respective fixed film media pods 36 and 38 assures that the diffusers 66 and 68 are elevated above the bottom 32 of the tank 14. If the diffusers 66 and 68 would be positioned too low and/or adjacent to the bottom 32 of the tank 14, the diffusers would tend to stir up the material that has sloughed off the fixed film media pods. As such, this will adversely affect sludge management and the quality of the effluent being released through the outlet 18 of tank 14. An air line 46 is illustrated as connected to the diffuser 66. An air line 48 is illustrated as connected to the diffuser 68. Air lines 46 and 48 will connect to the air line 52 associated with the air pump 42. Each of the diffusers 66 and 68 is a fine air diffuser having fine pores so as to release small microbubbles into the liquid within the interior of the tank 14. Under certain circumstances, course bubble diffusion will work depending on the oxygen dissolving requirements of the wastewater treatment system. As such, in the preferred embodiment the present invention, a fine air diffuser is used, but this should not be construed as limiting of the type of the diffuser. The type of diffuser is largely dependent upon the requirements of the system.

Figure 3:
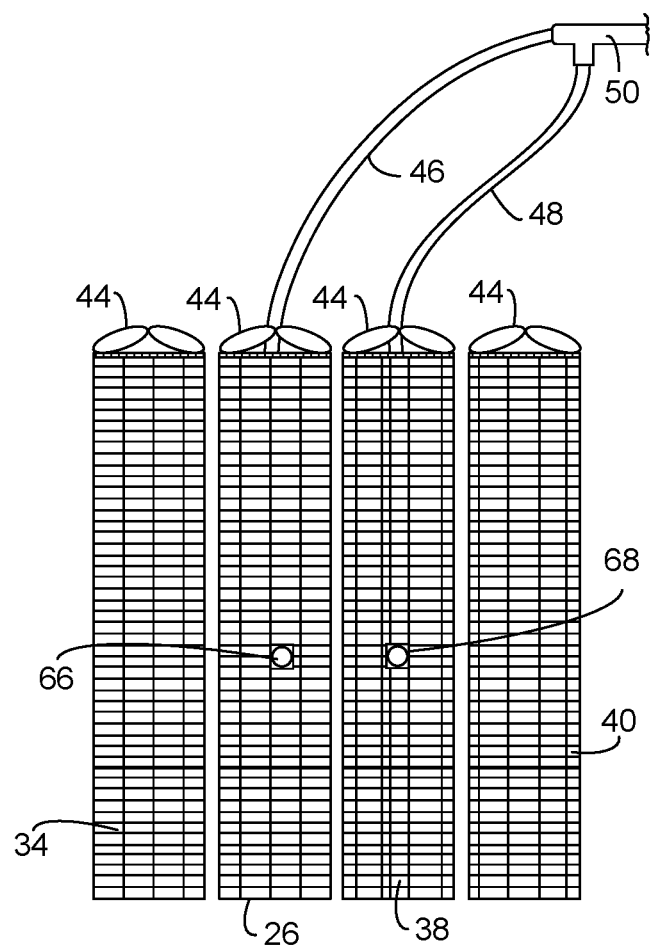
FIG. 3 is a side elevational view of the Drewery array of fixed film media pods as employed in the wastewater treatment apparatus of the present invention.

FIG. 3 is an isolated view showing the configuration of the fixed film media pods 34, 36, 38 and 40. Each of the fixed film media pods 34, 36, 38 and 40 is arranged so as to float into a random configuration of pods. Alternatively, the fixed film media pods 34, 36, 38 and 40 can be arranged in a rectilinear configuration. Generally, the configuration of the fixed film media pods 34, 36, 38 and 40 will be "self-positioning" within the liquid in the tank. As such, the fixed film media pods can move rather randomly in any direction during the wastewater treatment process. Floats 44 are positioned at the top of each of the fixed film media pods 34, 36, 38 and 40. Air lines 46 and 48 extend outwardly from T-fitting 50 so as to join with diffusers 66 and 68 of fixed film media pods 36 and 38, respectively. Within the concept of the present invention, fewer than four fixed film media pods or greater than four fixed film media pods can be used depending on the size of the treatment facility and the wastewater being treated. The size of each of the pods can be adapted to the needs of the wastewater treatment system. Suitable fasteners could be used so as to secure the fixed film media pods 34, 36, 38 and 40 together. Importantly, the present invention is a "modular" system. As such, the fixed film media pods can be added or removed as needed. It can easily be customized to the treatment requirements of the wastewater treatment system.

Figure 4:
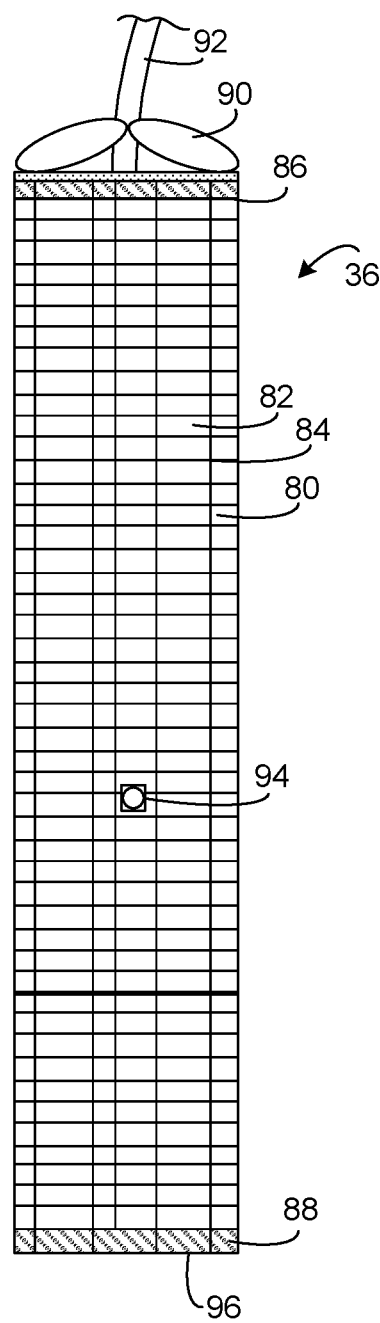
FIG. 4 is an isolated side elevational view of a single fixed film media pod as employed in the wastewater treatment apparatus of the present invention.

FIG. 4 shows a single fixed film media pod 36 of the present invention. Within the concept of the present invention, there are certain circumstances where in a single fixed film media pod 36 can be used for the treatment of wastewater in the biofilm reactor. It can be seen that fixed film media pod 36 has a generally tubular structure 80 of a polymeric mesh material 82. The polymeric mesh material has openings 84 framed by the polymeric mesh material. There is a top ring 86 and a bottom ring 88 surrounded by or surrounding the polymeric mesh material 82. At least one float 90 is affixed to the generally tubular structure 80 adjacent to the top ring 86. Air line 92 extends outwardly of the generally tubular structure 80. Air line 92 will extend from the exterior of the generally tubular structure 80 and connect with the fine air diffuser 94. Fine air diffuser 94 is affixed to the generally tubular structure at one side thereof.

Figure 6:
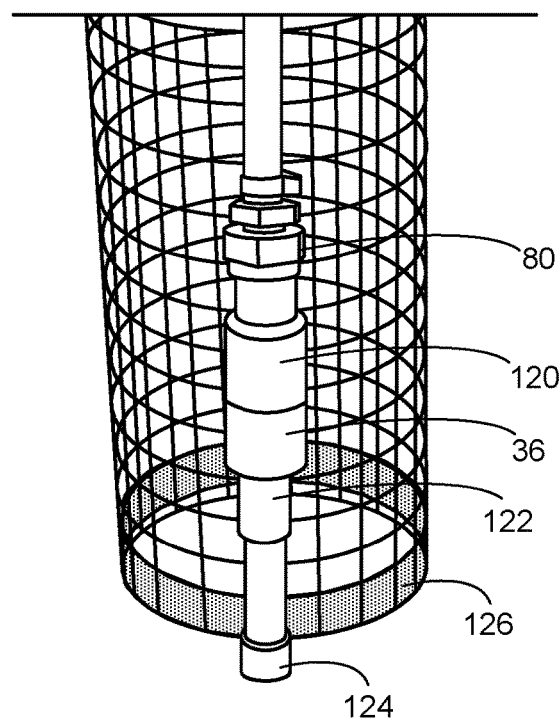
FIG. 6 is a side elevational view showing the diffuser associated with the weighted member in accordance with a wastewater treatment apparatus of the present invention.

Importantly, in the present invention, it should be noted that the positioning of the diffuser 94 along the generally tubular structure 80 can cause the generally tubular structure 80 to deflect as a result of the force of air bubbles inside the fine air diffuser 94. This could cause the generally tubular structure 80 of the fixed film media pod 36 to lean at an improper angle. As such, in order to compensate for this lean, a weight 96 is illustrated as affixed to the bottom ring 88 on the same side of the bottom ring 88 as the diffuser 94 is affixed. This weight 96 will counter the forces of air inside the diffuser 94. As such, the generally tubular structure 80 will remain in a vertical orientation within the liquid within the wastewater treatment tank. Importantly, however, the weight can be directly affixed to the bottom of the diffuser (as shown in FIG. 6) or can be affixed to the generally tubular structure 80 in a location spaced from and below the diffuser 94. Under those circumstances where the generally tubular structure 80 does not include a fine air diffuser, the action of the microorganisms and the flow of liquid within the tank can cause the generally tubular structure 80 to deflect at an improper angle. As such, so as to avoid this deflection caused by natural forces within the tank, a plurality of weights can be placed adjacent to the bottom of the generally tubular structure (in the manner shown in FIG. 7).

Figure 5:
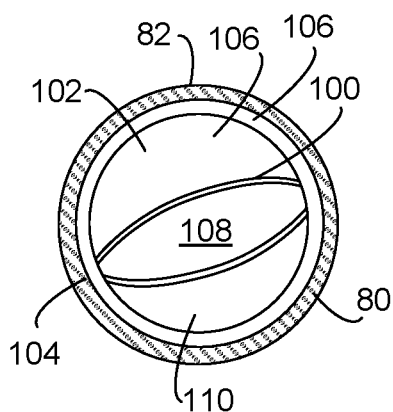
FIG. 5 is a cross-sectional view of the fixed film media pod of the present invention in a cross-sectional plane parallel to the longitudinal axis of the fixed film media pod.

FIG. 5 is a cross-sectional view of the fixed film media pod 36 of FIG. 4. This is a cross-sectional view taken in the plane transverse to the longitudinal axis of the tubular structure 80 or on a cross-sectional view taken in a plane parallel to the bottom 32 of the tank 14. In FIG. 5, the top ring 86 is particularly illustrated as having a circular configuration. The polymeric mesh material 82 is affixed to the exterior of the top ring 86. However, within the concept of the present invention, the polymeric mesh material 82 can be affixed to the interior of the top ring 86. A similar configuration would occur with respect to the bottom ring 88. Importantly, there is an interior mesh material 100 that is positioned in the interior 102 of the generally tubular structure 80. This interior mesh 100 has a generally teardrop shape. This teardrop shape is created by taking a panel of the mesh material and folding it over so that ends of the mesh material can join with one another at ends 104. As such, this teardrop-shape of interior mesh 100 will create three compartments 106, 108 and 110 of generally similar volume within the interior of the generally tubular structure 80. This will further create the "biomaze" through which the wastewater must pass and also increases the area of media of each pod. As such, the use of this interior mesh greatly enhances the ability of the fixed film media pod to treat the waste. It is believed that the interior mesh can enhance the ability of the fixed film media pod to treat wastewater, however, depending on the requirements of the wastewater treatment system, this interior mesh may or may not be necessary.

FIG. 6 shows the configuration of the fixed film media pod 36 as having diffuser 120 affixed to an exterior surface of the generally tubular structure 80. The diffuser 120 is a fine air diffuser (although a course air diffuser may be acceptable depending on the requirements of the system). Importantly, there is a weighted member 122 which is affixed to the bottom of the diffuser 120. Weighted member 122, in a simple embodiment, can be a tube of PVC pipe that is threadedly connected to the bottom of the diffuser 120. The PVC pipe of weighted member 122 can be filled with lead shot so as to create the requisite weighting effect. If desired, the bottom 124 of the weighted member 122 can be affixed to the exterior surface of the generally tubular structure 80 or otherwise secured to the bottom ring 126. In an alternative embodiment, there is a blind disc between the diffuser 120 and the weighted member 122. The blind disc separates the lead shot from diffuser 120. In this configuration, the weighted member 122 is directly below the diffuser 120 so as to counter the effects of air in the diffuser. This will generally maintain the vertical orientation of the biofilm reactor 36 of the wastewater treatment system.

Figure 7:
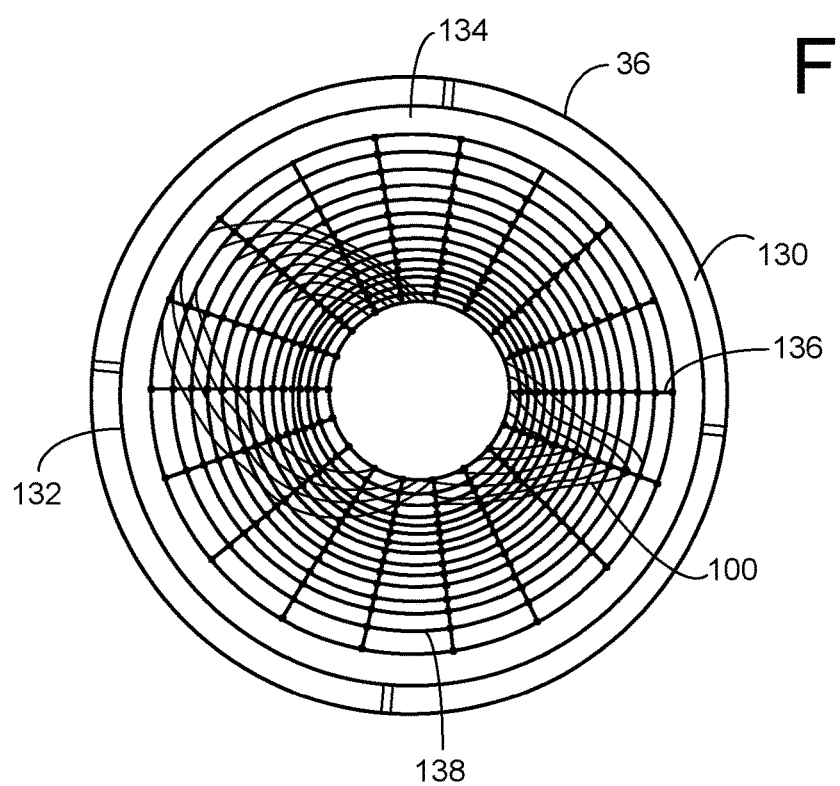
FIG. 7 is a bottom view of the fixed film media pod of the wastewater treatment apparatus of the present invention.

FIG. 7 is a bottom view of the biofilm reactor 36 of the present invention. In particular, FIG. 7 shows the interior mesh 100 is of a teardrop shape. The bottom ring 130 has a plurality of weights 132, 134, 136 and 138 affixed thereto. Weights 132, 134, 136 and 138 are illustrated as being positioned approximately 90° from each other around the circumference of the bottom ring 130. This even distribution of the weights 132, 134, 136 and 138 assures that the biofilm reactor 36 is of a vertical configuration within the liquid in the wastewater treatment tank. Under certain circumstances, a pair of the weights 132, 134, 136, and 138 can be applied instead of the four weight array. If only two weights are used, then they should be placed diametrically apart from each other. The weights 132, 134, 136 and 138 can be applied by adhesives or by other fasteners.

Figure 8:
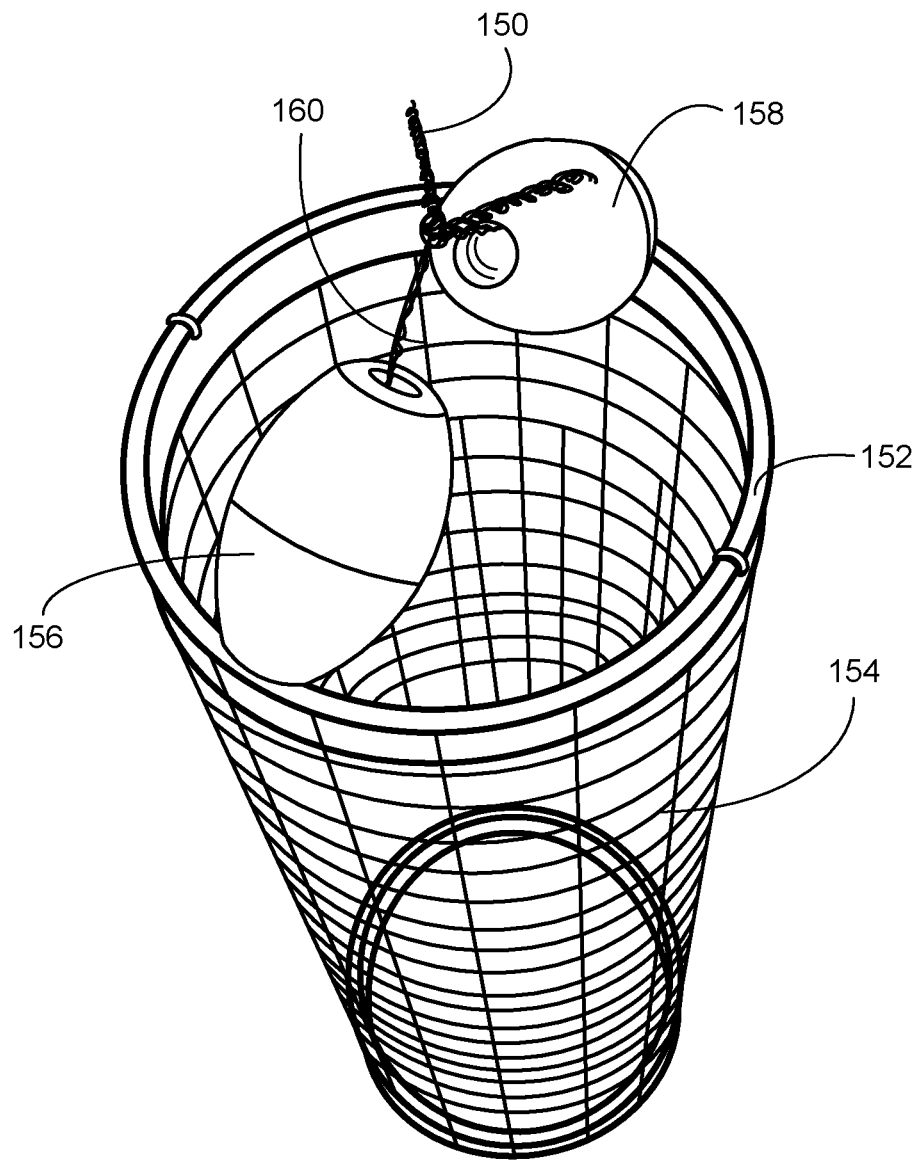
FIG. 8 is a perspective view of the fixed film media pod showing the line extending from the fixed film media pod.

FIG. 8 shows a line 150 as affixed adjacent the top ring 152 of the tubular structure 154. Specifically, line 150 is a rope. However, line 150 could be a chain, a strap, a cord, a wire or similar structure. The line 150 is illustrated as extending upwardly and away from tubular structure 154. In FIG. 8, there are a pair of floats 156 and 158 that each have one end secured to the top ring 152 and/or to the tubular structure 154. A linking line 160 extends between floats 156 and 158. Line 150 is shown as connected at one end to the linking line 160. The line 150 is adapted to allow a person to raise and/or lower the fixed film media pod through the access opening and from and into the liquid in the wastewater treatment tank. The upper end of line 150 can be clipped or secured adjacent to the access opening so as to allow for easy and convenient installation and removal of the fixed film media pod (along with the diffuser if attached). This greatly enhances the ability to maintain the fixed film media reactor.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

We claim:

1. A method of forming a biofilm reactor, the method comprising:

forming a fixed film media pod having a mesh structure with openings framed by polymeric material and with no random packing on an interior thereof;

affixing at least one float onto the fixed film media pod;

installing the fixed film media pod into a wastewater treatment tank and into a liquid in an interior of the tank such that the fixed film media pod resides in a generally vertical orientation above a bottom of the tank;

placing an air diffuser into the liquid in the interior of the tank at an exterior of the fixed film media pod;

wrapping the polymeric mesh around an interior or an exterior of a top ring and a bottom ring so as to create a generally tubular structure;

joining ends of a polymeric mesh panel so as to create a teardrop-shaped structure; and affixing the teardrop-shaped structure into an interior of the generally tubular structure of the fixed film media pod.

2. The method of claim 1, further comprising:

affixing the air diffuser onto an exterior surface of the fixed film media pod such that the air diffuser is positioned above the bottom of the tank; and extending an air line from the air diffuser outwardly of the fixed film media pod and outwardly of a riser opening of the tank.

3. The method of claim 2, further comprising:

connecting an end of the air line to the air pump.

4. The method of claim 3, further comprising:

affixing the air diffuser onto a surface of the fixed film media pod such that the air diffuser is positioned above the bottom of the tank; and applying a weight adjacent a bottom of the fixed film media pod on a same side of the fixed film media pod as the side to which the air diffuser is affixed, the weight being adapted to counter a force of air in the air diffuser.

5. The method of claim 1, the step of forming further comprising:

applying the float onto the fixed film media pod adjacent a top of the fixed film media pod, the float adapted to cause the fixed film media pod to float above the bottom of the tank.

* * * * *